US009756024B2

(12) United States Patent
Benedek

(10) Patent No.: US 9,756,024 B2
(45) Date of Patent: Sep. 5, 2017

(54) COMPUTER-IMPLEMENTED CRYPTOGRAPHIC METHOD FOR IMPROVING A COMPUTER NETWORK, AND TERMINAL, SYSTEM AND COMPUTER-READABLE MEDIUM FOR THE SAME

(71) Applicant: Trillium Incorporated, Nagoya-shi (JP)

(72) Inventor: Aaron Sanjaya Benedek, Tokyo (JP)

(73) Assignee: Trillium Incorporated, Tokyo (JP)

( * ) Notice: Subject to any disclaimer, the term of this patent is extended or adjusted under 35 U.S.C. 154(b) by 0 days.

(21) Appl. No.: 15/268,532

(22) Filed: Sep. 16, 2016

(65) Prior Publication Data
US 2017/0085537 A1 Mar. 23, 2017

Related U.S. Application Data

(60) Provisional application No. 62/284,038, filed on Sep. 18, 2015.

(51) Int. Cl.
*H04L 29/06* (2006.01)
*H04L 9/08* (2006.01)
(Continued)

(52) U.S. Cl.
CPC ........ *H04L 63/0435* (2013.01); *H04L 9/0822* (2013.01); *H04L 9/0825* (2013.01);
(Continued)

(58) Field of Classification Search
CPC ... H04L 67/12; H04L 67/125; H04L 63/0428; H04L 63/0435; H04L 63/045;
(Continued)

(56) References Cited

U.S. PATENT DOCUMENTS 4,200,770 A  4/1980 Hellman et al.
4,227,253 A  10/1980 Ehrsam et al.
(Continued)

FOREIGN PATENT DOCUMENTS

DE  102015207220 A1  10/2010

OTHER PUBLICATIONS

Andreas Muller & Timo Lothspeich, Plug-and-Secure Communication for CAN, Oct. 28, 2015, pp. 1-24, Robert Bosch Gmbh., Germany.
(Continued)

*Primary Examiner* — Tae Kim
(74) *Attorney, Agent, or Firm* — The Harris Firm

(57) ABSTRACT

A method at a terminal in a multiple-node digital communications network, comprising any one or more of: generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s); generating at least one symmetric third key(s) for one or more communication session that includes one or more communications from the at least one message-transmitting node(s) to the message-receiving node(s); encrypting at least one payload message using the at least one third key(s) at the at least one message-transmitting node(s), sending the encrypted at least one payload message, and receiving the encrypted at least one payload message at the at least one message-receiving node(s); encrypting the at least one third key(s) using the at least one first key(s), sending the encrypted at least one third key(s), and receiving the
(Continued)

encrypted at least one third key(s) at the at least one message-receiving node(s); decrypting the at least one third key(s) using the securely distributed at least one first key(s), at the at least one message-receiving node(s); and decrypting the at least one encrypted payload message using the decrypted at least one third key(s), at the at least one message-receiving node(s). A terminal, system, and computer readable medium are also disclosed.

30 Claims, 9 Drawing Sheets

(51) Int. Cl.
*H04L 9/14* (2006.01)
*H04L 29/08* (2006.01)
(52) U.S. Cl.
CPC .............. *H04L 9/14* (2013.01); *H04L 63/062* (2013.01); *H04L 63/162* (2013.01); *H04L 63/168* (2013.01); *H04L 67/12* (2013.01); *H04L 2209/805* (2013.01); *H04L 2209/84* (2013.01)
(58) Field of Classification Search
CPC . H04L 2012/40273; H04L 2012/40215; H04L 2209/84
See application file for complete search history.

(56) References Cited

U.S. PATENT DOCUMENTS

| | | | |
|---|---|---|---|
| 5,029,208 | A | 7/1991 | Tanaka |
| 5,872,519 | A | 2/1999 | Issa et al. |
| 5,952,933 | A | 9/1999 | Issa et al. |
| 6,175,312 | B1 | 1/2001 | Bruwer et al. |
| 6,442,525 | B1 | 8/2002 | Silverbrook et al. |
| 6,657,535 | B1 | 12/2003 | Magbie et al. |
| RE40,073 | E | 2/2008 | Breed |
| 7,356,832 | B1 | 4/2008 | Eibach et al. |
| 7,382,883 | B2 | 6/2008 | Cross et al. |
| 7,484,008 | B1* | 1/2009 | Gelvin ................... H04L 67/12 701/408 |
| 7,512,804 | B2 | 3/2009 | Nunnelley |
| 7,657,488 | B2 | 2/2010 | Silverbrook |
| 7,742,603 | B2 | 6/2010 | Tengler et al. |
| 8,009,025 | B2 | 8/2011 | Engstrom et al. |
| 8,254,581 | B2 | 8/2012 | Wan et al. |
| 8,378,800 | B2 | 2/2013 | Mackjust et al. |
| 8,718,797 | B1* | 5/2014 | Addepalli ............. H04W 4/046 700/17 |
| 8,761,390 | B2* | 6/2014 | Peirce ................... H04L 9/0869 380/278 |
| 8,922,357 | B2 | 12/2014 | Miller et al. |
| 9,361,178 | B2* | 6/2016 | Hartwich ............ G06F 13/4282 |
| 2001/0010721 | A1 | 8/2001 | Murakami |
| 2003/0184159 | A1* | 10/2003 | Josephine Kees .... B60R 25/045 307/10.3 |
| 2005/0177284 | A1 | 8/2005 | Kugumiya et al. |
| 2007/0011023 | A1 | 1/2007 | Silverbrook |
| 2007/0160199 | A1 | 7/2007 | Sekiguchi et al. |
| 2009/0323967 | A1* | 12/2009 | Peirce ................... H04L 9/0869 380/278 |
| 2011/0093639 | A1* | 4/2011 | Richards ........... H04L 12/40032 710/310 |
| 2012/0036297 | A1* | 2/2012 | Choi ....................... H04L 67/12 710/110 |
| 2012/0093312 | A1 | 4/2012 | Gammel et al. |
| 2013/0145482 | A1* | 6/2013 | Ricci ......................... G06F 9/54 726/28 |
| 2013/0204943 | A1* | 8/2013 | Ricci ..................... G06F 3/0484 709/204 |
| 2013/0227648 | A1* | 8/2013 | Ricci ..................... G06F 3/0484 726/3 |
| 2014/0129748 | A1* | 5/2014 | Muth .................. G06F 13/4072 710/106 |
| 2014/0229519 | A1* | 8/2014 | Dietrich ................. H04L 67/10 709/201 |
| 2014/0365693 | A1* | 12/2014 | Monroe ................ G06F 13/385 710/105 |
| 2015/0033016 | A1* | 1/2015 | Thornton .............. H04L 9/0825 713/171 |
| 2015/0172298 | A1* | 6/2015 | Otsuka .................. H04L 63/123 726/30 |
| 2015/0229741 | A1* | 8/2015 | Kim ..................... H04L 12/4625 370/467 |
| 2015/0350241 | A1* | 12/2015 | Mayer ................... H04L 63/123 726/3 |
| 2015/0365389 | A1* | 12/2015 | Zhang .................... H04L 63/08 713/171 |
| 2016/0173530 | A1* | 6/2016 | Miyake ................... H04L 63/08 726/3 |
| 2016/0255154 | A1* | 9/2016 | Kim ........................ H04L 9/00 726/25 |
| 2016/0315766 | A1* | 10/2016 | Ujiie ...................... B60R 16/02 |
| 2016/0323312 | A1* | 11/2016 | Voelker .................. H04L 63/08 |

OTHER PUBLICATIONS

Shalabh Jain & Jorge Guajardo, Physical Layer Group Key Agreement for Automotive Controller Area Networks, pp. 1-20, Robert Bosch LLC, USA.
David M. Uze, Trademark Application Dynamic Key-Lock Pairing, Serial No. 86796118, Oct. 22, 2015, p. 1-5, USA.
Anderson Cozmo Uze, Trademark Application HeavenZ, Serial No. 86820735, Nov. 16, 2015, p. 1-5 USA.
Anderson Cozmo Uze, Trademark Application SecureBoot, Serial No. 86838877, Dec. 3, 2015, p. 1-5, USA.
David M. Uze, Trademark Application SecureCAN, Serial No. 86796052, Oct. 22, 2015, p. 1-5, USA.
Anderson Cozmo Uze, Trademark Application SecureCAR, Serial No. 86820744, Nov. 16, 2015, pp. 1-5, USA.
Anderson Cozmo Uze, Trademark Application SecureETHER, Serial No. 86838898, Dec. 4, 2015, pp. 1-5, USA.
Anderson Cozmo Uze, Trademark Application SecureIoT, Serial No. 86820724, Nov. 16, 2015, pp. 1-5, USA.
Anderson Cozmo Uze, Trademark Application SecureLIN, Serial No. 86820687, Nov. 16, 2015, pp. 1-5, USA.

\* cited by examiner

COMPUTER-IMPLEMENTED CRYPTOGRAPHIC METHOD FOR IMPROVING A COMPUTER NETWORK, AND TERMINAL, SYSTEM AND COMPUTER-READABLE MEDIUM FOR THE SAME

STATEMENT CONCERNING RELATED PATENT APPLICATIONS

The present application claims the benefit, under 35 U.S.C. §119(e), of U.S. provisional patent application Ser. No. 62/284,038, filed on Sep. 18, 2015, which is hereby incorporated by reference herein, in its entirety.

TECHNICAL FIELD

The present disclosure relates to a computer-implemented cryptographic method for one or more of increasing data processing efficiency and improving data security, of any one or more computer(s), microcontroller(s) or micropro-cessor(s) that are communicatively connected to a digitally stored and digitally operated network comprising one or more controller area network (CAN) bus, local interconnect network (LIN) bus or related computer network; and a terminal, a system and a computer-readable medium for the same.

BACKGROUND

A motor vehicle may be viewed as a distributed network with multiple communication nodes spread throughout the network defined by one or more of: the semiconductors or other hardware (MCU/MPU/SoC or ECU) used, the hardware interconnect, and finally the hardware purpose or function. Each node has one or more granularly defined function(s). The standard communication protocols utilized in the majority of modern vehicle makes and models were defined years ago and therefore are limited in network bandwidth, with 8 byte, 4 byte and 2 byte message size limitations of those networks being a common configuration. Some of the more common automotive network protocols are, for instance, controller area network (CAN) and local interconnect network (LIN). Newer standards have been defined (e.g., CAN FD); however generally those new network standards have yet to be widely adopted by the automotive industry due to cost and other engineering constraints.

As automobiles and other motor vehicles are increasingly connected, e.g., to the internet via 3G or 4G connections, and gain broadband Ethernet access, hackers are able to exploit new attack surface(s). Hackers have recently been successful at hacking and gaining control of vehicles such as the widely publicized (July 2015) hack of a Jeep® Grand Cherokee®, which was illicitly remotely controlled and driven off the road by two hackers, from the comfort of their home miles away, wielding nothing except a laptop and an internet connection.

It would be desirable to provide a more effective method of creating, e.g., CAN bus (or LIN bus) digital privacy management. Most experts, however, expect that it would be very difficult, if not impossible, to achieve a secure CAN bus.

SUMMARY

This disclosure includes, but is not limited to, the following aspects of securing the network(s):

First and second aspects of the disclosure may or may not be directed to respective method and computer readable medium (or alternately throughout "computer storage apparatus") causing operations, for each comprising any one or more of:

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

Third and fourth aspects of the disclosure may or may not be directed to respective processor-based terminal and processor-based system for, each comprising any one or more of, (1) at least one processor; and at least one memory storing instructions that, when executed by the at least one processor, cause the at least one processor to cause, and (2) a module or means for, any one or more of:

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

Additional or alternative aspects of the disclosure are found in the appended claims. Further aspects, embodiments, features, and advantages of the embodiments, as well as the structure and operation of various embodiments are described in detail below with reference to accompanying drawings.

BRIEF DESCRIPTION OF THE DRAWINGS

In the accompanying drawings, which form a part of the specification and are to be read in conjunction therewith, and in which like reference numerals are used to indicate like features in the various views.

DETAILED DESCRIPTION

Figure 1:
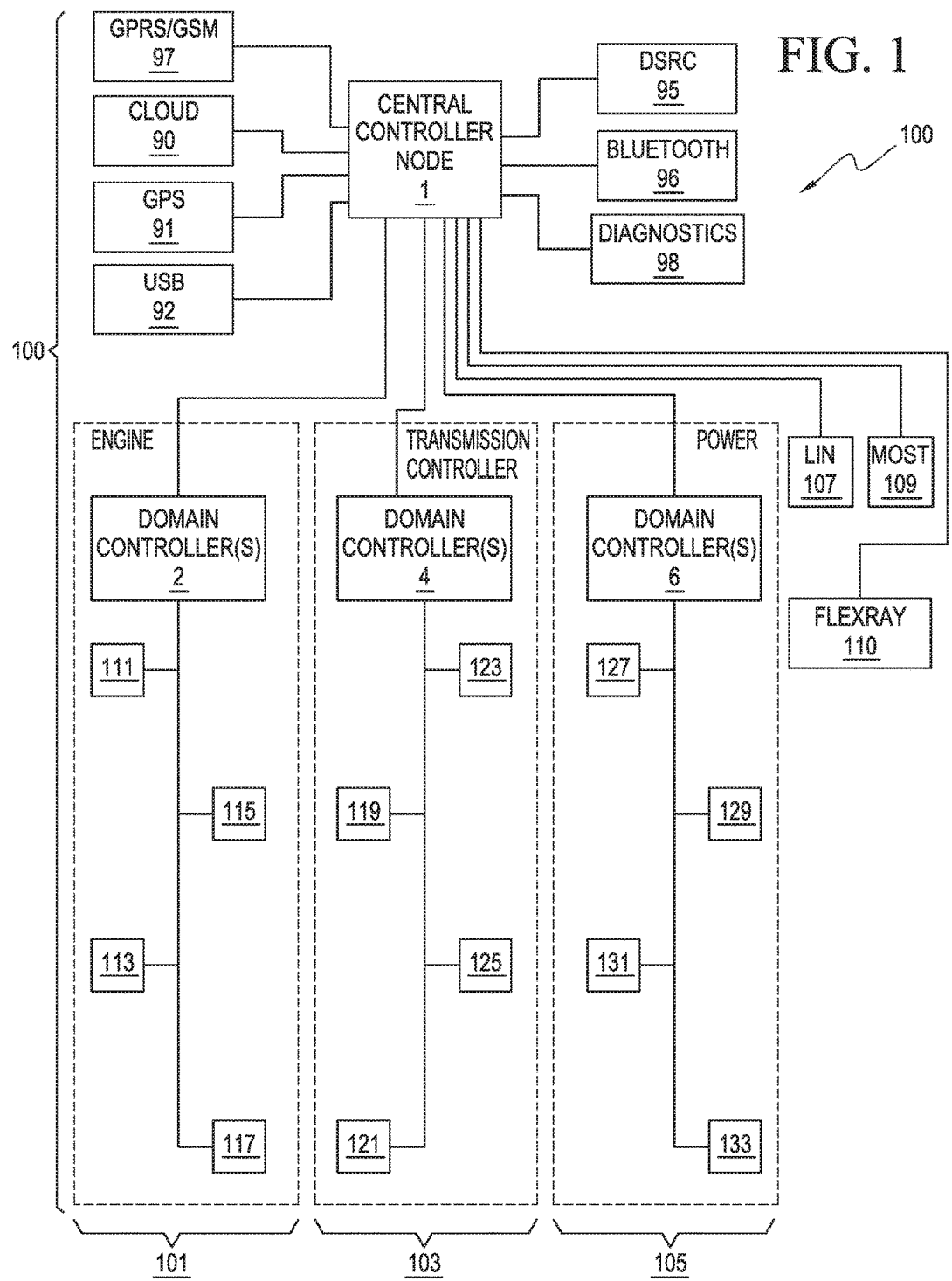
FIG. 1 is a schematic diagram of an exemplary network comprising one or more controller area network (CAN) bus computer network environment(s), in which embodiments may be implemented.

Embodiments of the disclosure are concerned with the calculation of one or more data set transformation instructions, in certain cases the transmission of those instructions to at least one local or remote CAN bus, LIN bus, or remote computer(s) (e.g., but not limited to, any combination of one or more of, a bank of, and geographically disparate communicatively connected, server(s) that manipulate or monitor data). Ultimately, though not in certain method, terminal, system and computer-readable media embodiments, these instructions may or may not also be executed at one or more networks comprising CAN bus or LIN bus microcontroller(s), server(s), storage device(s) or other computer hardware holding or capable of encrypting/decrypting data being operated on. Ultimately, the data available for unauthorized viewing, hacking or manipulating on networked CAN bus, LIN bus or related computer networks are reduced.

Though un-expectantly, it becomes apparent that data security and technological leveraging seemingly cannot coexist, creating a technically derived tension. For example, every system of a modern automobile, whether manually-driven or automatically-operated, either of which using locally-or-remotely-generated instructions, is subject to hacking, and thus partial or complete unauthorized control or viewing. This unprecedented danger can be attributed to the technical efficiencies provided by its particular digital interaction platform. Other non-CAN networks outside of each vehicle present similar challenges.

Embodiments herein reduce one or more of the storage space required to store data, the bandwidth required to aggregate and calculate data, and the computing resources, time, and energy previously required securely to function, especially as regarding management of sensitive automotive operational data.

Embodiments herein include means to secure the distributed networks internal to an environment (for example an automobile), with negligible impact on existing bandwidth constrained internal networks (e.g., CAN bus, LIN bus, etc.).

Embodiments herein may or may not be specifically designed for encrypting message payloads at 8 byte, 4 byte and 2 byte boundaries may or may not and do so within a three millisecond threshold defined as necessary for real-time automotive applications. These features support not only preventative measures such as encryption, but also counterattack measures designed to crash rogue nodes or leverage Big Data to identify the source of a nefarious attack.

Embodiments may or may not be installed (and in current use) running on up to all nodes connected to a CAN bus, LIN bus or related computer network and provide end-to-end encryption and key management over existing automotive distributed networks.

In embodiments, instructions work at the application layer by encrypting a message payload using a cipher.

In embodiments, key management technology is implemented via an encrypted virtual channel and may or may not be used to send new session key(s) to all nodes on a network at any one of more of variable, predetermined, regular, period and random frequency.

In embodiments, certain of the herein-indicated non-limiting technical advantages and/or others, each of which depend upon what particular combination of features disclosed herein is found in an embodiment, are realized only upon persistent and arduous study through both (a) discovering the very existence of the above-indicated technical tension, and (b) inventing the technical solutions disclosed in part herein.

In embodiments, resulting advantages may or may not include, but are not limited to, one or more of:

(1) Encrypting messages in automotive distributed internal networks including CAN and LIN buses for use in real-time automotive applications with a negligible impact on performance of the bus and within, e.g., a <3 milliseconds cycle time threshold required for such automotive applications;

(2) Securely establishing a master key among all participating nodes.

(3) Securely distributing new session keys to participating nodes on the communication bus over an encrypted virtual channel at either periodic or pseudo-random intervals;

(4) Initiating a counterstrike attack against a rogue node (hacker node), which may include but is not limited to: crashing the rogue node, leveraging Big Data and commercial analytics engines to discover the machine identity and location of the hack origin, or other unknown information.

(5) Performing one or more of the other advantages, without modifications to existing application message protocol or additional hardware cost.

(6) Performing one or more of the other advantages, while being one or more of hardware architecture agnostic, operating system agnostic, transport agnostic regarding use on non-CAN transports, and cipher agnostic.

In embodiments, operations by which data set transformations are made improve data security by preserving or reclaiming the privacy of certain data.

In embodiments, operations by which data set transformations are made increase system operational efficiency at each terminal.

In embodiments, operations by which data set transformations are made strike an optimal balance between improving data security by preserving or reclaiming the privacy of data strings and objects on the one hand, and increasing system operational efficiency, on the other hand, all the while allowing continued data exchange and aggregation between one or more computers communicatively connected to at least one digitally stored and digitally operated CAN bus, LIN bus or related computer network.

Referring to FIGS. 1-6, the following describes a cryptographic system for securing a network comprising one or more CAN bus(es), LIN bus(es) or related computer network(s) by using at least two keys: (1) One or more master key(s) (MK) which can be used to encrypt any message transmitted between one or more nodes in network 100 and in particular is used to encrypt session key(s); and (2) one or more session key(s) (SK), which may or may not be used for secure message transmission before being discarded.

In embodiments, both MK and SK are symmetric keys which are used to encrypt messages using an ultra-lightweight encryption (ULWE) protocol.

In embodiments, a master key is first generated when a network starts to operate and optionally may or may not be replaced during that use of a network. The time at which the master key is replaced is customizable by a user who configures the network.

In embodiments, network 100 performs one or more of the following: enables secure encryption across a network of nodes by repetitively changing the key by which data encryption occurs; provides a method for secure master key establishment across one or more nodes in a network constrained by an 8 byte CAN bus or LIN bus; stores both a static whitelist based authentication process to establish initial participants, and a runtime authentication process that does not impact speed or size of message transmission; and provides secure synchronization of cryptographic session key establishment across one or more nodes.

One practice in a network is to encrypt all data before transmission as effective encryption will prevent unauthorized users of a network from initiating operations at any node in that network (e.g. CAN bus in a vehicle), unauthorized authentication of one or more unauthorized nodes and other attacks on one or more messages sent within that network (e.g. changing one or more bits in a message). In practice this is not currently done for CAN bus or LIN bus because it is thought by those of reasonable skill in the art that one or more of the following reasons apply: (i) costs would increase due to greater processor requirements to perform security checks (authentication) in real time, (ii) there would be a latent drag in message transmission (due to encrypting two or more messages together to match the block cipher size), (iii) it is impractical due to smaller code size being required to encrypt IVN CAN bus, LIN bus or related computer networks data, (iv) asymmetric key establishment processes generally cannot be used in the encryption process in these constrained networks as they are utilized for real-time applications due to latency (needing to wait for a larger amount of data to pass through and be processed by the system to implement the encryption). In embodiments of this disclosure, it is possible to securely encrypt, decrypt and authenticate all messages in a CAN bus, LIN bus or related computer networks without significantly increasing the processing requirements of the system, without adding material latency to the system, thereby adding an extra layer of security to the data sent within such a network.

FIG. 1 shows network 100 connecting one or more domain controller(s) (DC) 2-6 in a network with one or more node(s) 111-133 connected via a CAN bus. Each of the domain controller(s) 2-6 may or may not be treated as a node(s) in addition to node(s) 111-133. Different CAN bus systems exist, therefore all references herein to "CAN bus" include, but are not limited to, any system transmitting 8 or more bytes of data in each data packet including but not limited to any variations of a CAN bus system that are currently known or may be designed in the future, and any other non-CAN bus system transmitting packets of data equal to or more than 8 bytes in size. Examples of such networks include but are not limited to CAN bus, CAN bus 2.0, CAN FD, LIN bus, Ethernet, etc., any combination of one or more of which may be used to control the network(s) controlling the engine 101, transmission 103 or power 105, or any other functions over a network, and networks LIN 107, MOST 109, FlexRay 110. The network 100 can also be externally connected to one or more terminal(s) using any form of connection known presently or known in the future e.g. one or more of the non-limiting examples of GPRS/GSM 97, the Cloud 90, GPS 91, USB 92, DSRC 95, Bluetooth® 96 or internally to one or more processing units for example Diagnostics 98.

In embodiments, domain controller 2-6 has the same computational capability as any other node with which the domain controller(s) is connected. The domain controller(s) is distinguished by its ability to store data such as one or more key in a secure memory so that the one or more key may be distributed. The domain controller(s) receives group elements from one or more node(s) and distributes its group element to one or more node(s). All group elements are calculated using an asymmetric key establishment protocol or some other protocol which may or may not utilize the physical properties of the network itself. The same protocol is used at both the domain controller(s) and the one or more node(s) so no additional computing capability is required by the domain controller(s).

In embodiments, node(s) 111-133 in the CAN bus includes one or more of the following non-limiting examples of hardware: microcontroller unit, electronic controller unit, CAN transceiver, SoC small computer, smart phone, laptop, PC and Mac.

In embodiments, any connection between node(s) 111-133 comprises one or more wire(s), fiber optic cable(s), wireless (electromagnetic signal) connection(s) or some other connecting medium.

In embodiments, information is required to be sent across one or more CAN bus from one or more DC to one or more electronic control unit (ECU) to implement one or more instruction(s) at each node(s) 111-133.

Herein, messages and information are both synonymous with a string of one or more binary digits, "bits", although other representations of information are possible. There is no loss of generality in this assumption as it is known all information can be expressed as a series of zeroes and ones, i.e. in binary form, and therefore represented in the form of a string of bits. Instruction(s), however, are taken to include the code implementing a specific function of a feature at one or more node(s) 111-133.

In embodiments, messages that are to be sent to one or more node(s) 111-133 are encrypted using a symmetric key protocol and then sent to those one or more node(s) 111-133 and the key with which messages are encrypted will change. The frequency with which the key changes may or may not be random. After each change the next change may or may not occur in the next unit of time, i.e. key changes may or may not occur in an unpredictable manner. Repetitively changing the key results in added noise to message transmissions thereby preventing any attack to the system as any given message transmitted cannot easily be assigned to the key used to encrypt it and therefore each message cannot be decrypted by an attacker.

In embodiments, resulting encryption system(s) can be used for securing one or more area such as network 100 which may be securing any of the non-limiting examples of house(s), building(s), boat(s) or any other area containing a CAN bus or computer network.

Unless stated otherwise, herein users of a system (users) include one or more of the owner or authorized operator of the system transmitting encrypted messages, an authorized person known to that user, and the manufacturer of the system being used.

Software Modules

Figure 2:
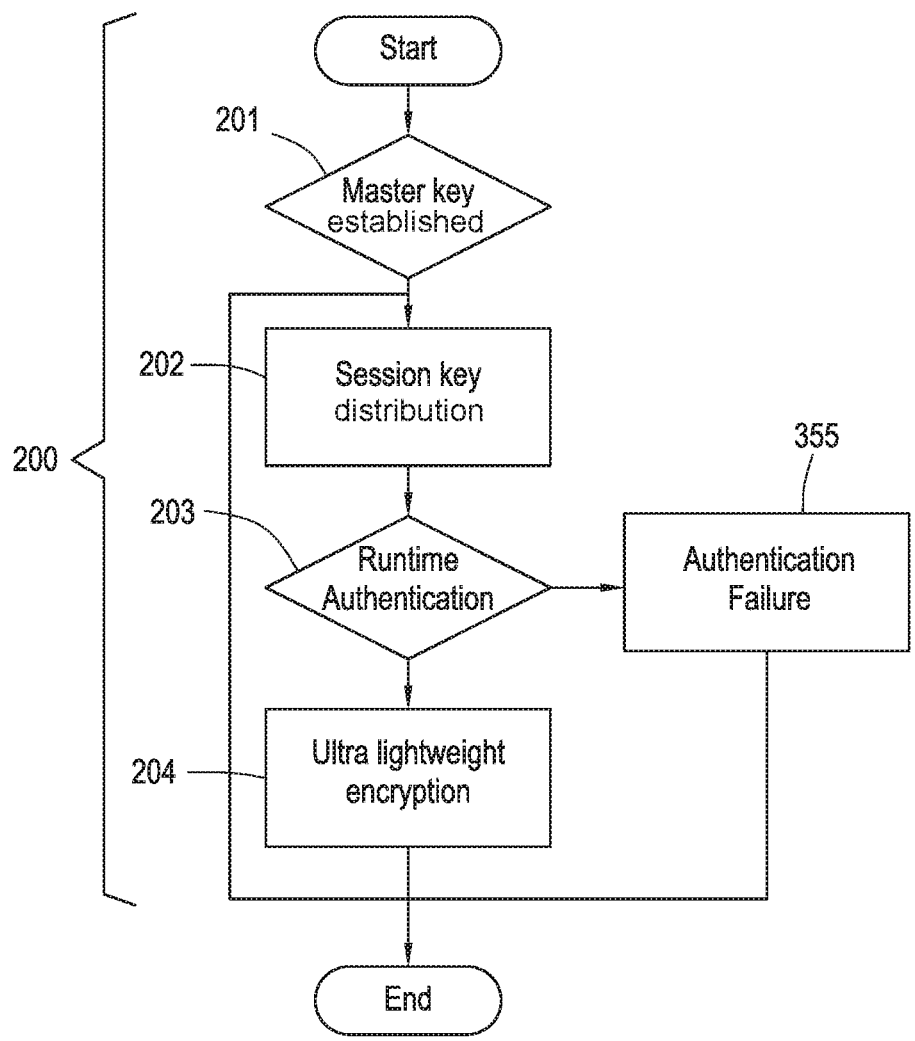
FIG. 2 is a diagram of software components, according to embodiments.

FIG. 2 illustrates several embodiment(s) of secured network 200 modules and software components, and operation of the same are described as follows in detail.

1. secured network 200
    a. master key and static authentication module 201
    b. session key distribution 202
    c. runtime authentication 203
    d. ultra-lightweight encryption 204

In embodiments, master key and static authentication module 201 provides a method for securely generating one or more master key for all participant nodes using a multi-node variant of an asymmetric key generation algorithm (e.g., the non-limiting example of the Diffie Helman key exchange protocol; in embodiments any other suitable asymmetric key generation protocol may be selected by a user and implemented, or in the case of a CAN bus or LIN bus, optionally by using the inherent electrical properties of those buses).

In embodiments, in order to determine the validity of all participants, once the master key has been generated by all participants, each participant sends an encrypted version of their unique identifier (unique ID) to their associated domain controller, DC 2-6. The domain controller 2-6 has a list of valid unique ID(s) 'a whitelist'. In embodiments, this whitelist is established at one or more of the following times: installation during manufacture at the factory, or a later time when the network can be updated securely either remotely or locally.

In embodiments, each node's unique ID is validated against the whitelist at DC 2-6. Whenever an invalid unique ID is presented or a unique ID is presented more than once, an invalid node is detected. The static authentication processor at DC 2-6 reports an 'invalid node' notification and in embodiments optionally deploys one or more countermeasures to the extent possible.

In embodiments to generate a master key, each node generates its own group element 301. This is done by implementing any desired asymmetric key generation protocol. Embodiments allow a user to select an asymmetric protocol. Examples of such protocols include but are not limited to Diffie Hellman Key Exchange, RSA or key derivation based on the electrical properties of a targeted bus.

In embodiments, protocol(s) used to establish one or more master key(s) over a network may or may not use properties inherent to the network or its constituent parts to generate a secret number which is known at one or more node(s). (For example, in a CAN bus one stage of data transfer may be designed for contention resolution (arbitration) between nodes. During arbitration phase(s), all nodes may transmit simultaneously, and the electrical properties of the CAN bus arbitrates what node is allowed to proceed to the data phase. When this CAN bus is used as an AND gate between all nodes, in this phase logical '0' is treated as a dominant bit and logical '1' is treated as a recessive bit. If any node transmits a '0' bit, the bus will obtain an effective state of '0' for that bit, even if all the other nodes transmit a '1' for the same bit. By using this property of the CAN bus one or more times, an asymmetric key comprising one or more bit(s) of data is shared secretly and a symmetric second key may be distributed without the computational cost of a traditional asymmetric algorithm.

In embodiments, arbitration phase(s) are any practical length in time and can be started and stopped at any predetermined time. During arbitration phase(s), secret information may or may not be extracted from data transmissions sent from nodes and stored securely in domain controller(s) 2-6. These secret data may be used at a later point in time to establish a new (but optionally, numerically or computationally different) transient key without the computational load of asymmetric encryption.

In embodiments a public key (r) and public modulus (m) are selected and used. The same public key and modulus are used at each node connected to a particular domain controller 2-6.

In embodiments, each node derives a private key using one or more of random data values, a bank of pseudo-random data or non-random data values.

In embodiments, some random data used to derive a private key is from the lower order bits or combination thereof from one or more types of sensors whose values are available. (E.g., the lower order bits of an accelerometer and/or thermometer, when combined should provide enough entropy to provide near true randomness.)

Figure 3A:
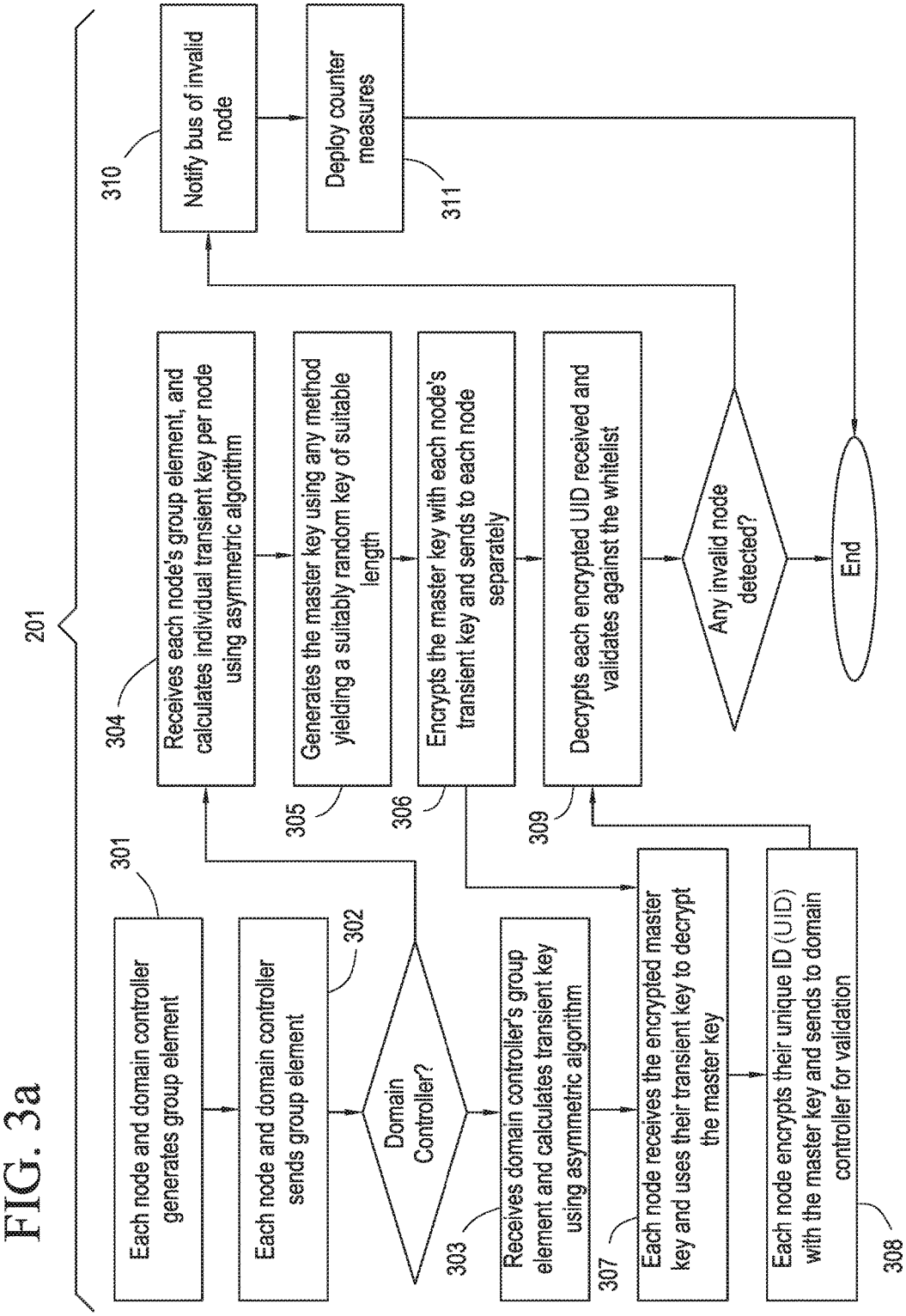
FIGS. 3*a*-3*e* are flow diagrams showing exemplary operations, according to embodiments.
Figure 3B:
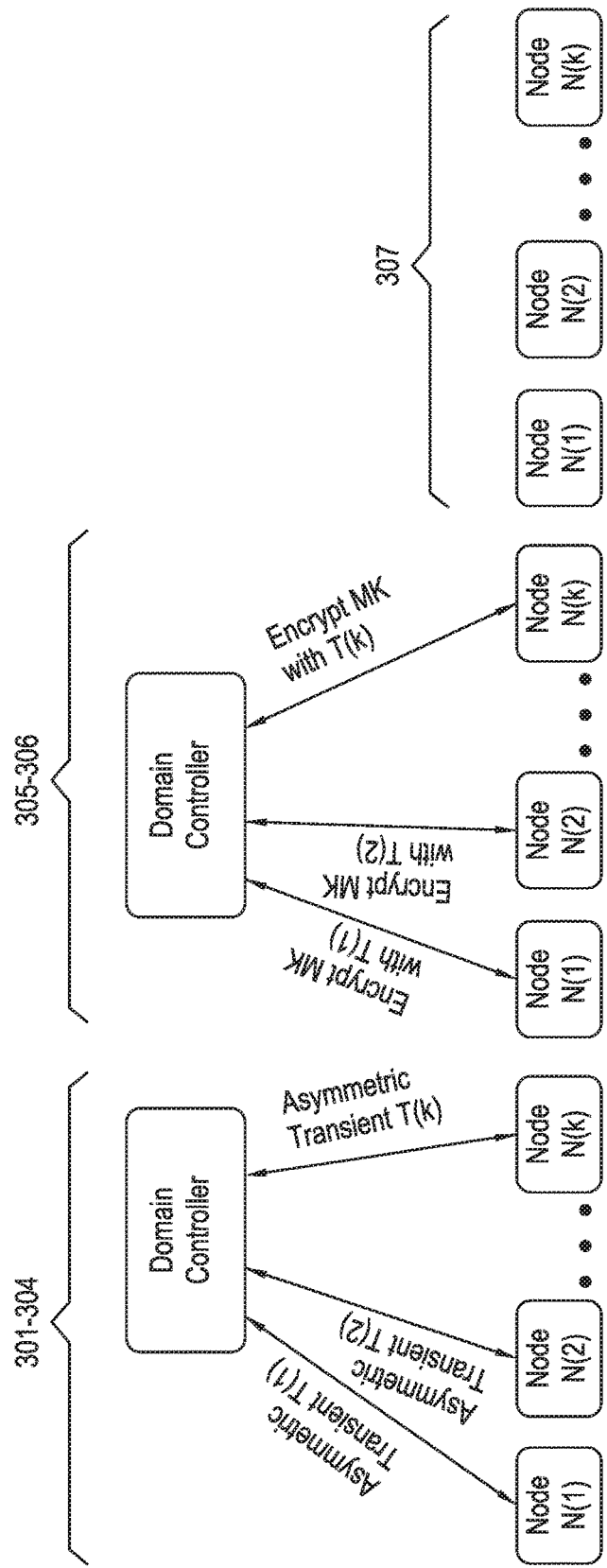

Now referring to FIGS. 3a and 3b, in embodiments, a private key at each node is combined with a public key and modulus to generate a group element (g) at that node (e.g., 301). For example, these three values can be combined to calculate an individual group element (g) such that $g=(r^k)$ mod (m).

In embodiments, when the domain controller has calculated its group element, it transmits that group element to all the other participating nodes on the same network. Each node also transmits its own group element to a domain controller 302. Nodes and the domain controller use Diffie Hellman or another suitable asymmetric key establishment protocol to compute each transient key (T). Each node computes a unique transient key by combining its group element and the group element of the domain controller 303. The domain controller computes each node's transient key 304. The domain controller derives the master key using one or more random data values which may or may not be obtained in the one or more methods detailed above from sensor data 305.

The domain controller encrypts a master key with each transient key (T) using a predetermined symmetric encryption algorithm and sends the encrypted master key to each node 306. Each node receives the master key from the domain controller encrypted with their own transient key, and decrypts the master key using their own transient key (T) and the same predetermined symmetric encryption algorithm so that each node obtains the master key 307. At the completion of this process, all nodes on the same network will share the same master key. FIG. 3b shows a physical representation of the transmission of data above when establishing a master key. The process occurs between the domain controller and the one or more node(s). 301-304 shows steps above where data is transferred in both directions; 305-306 shows steps where data is sent from the domain controller to node(s) and 307 is a step where decryption occurs at each node and no data channel is required.

In embodiments, each node encrypts its unique ID with the master key and submits its unique ID to the domain controller 308. The domain controller receives each node's unique ID and decrypts it. The domain controller 2-6 validates each unique ID against the whitelist of unique ID(s) 309, which is stored in secure memory, and is either pre-programmed at the factory, or updated locally or remotely. If an invalid unique ID is detected or even a valid unique ID is used and an anomaly is detected (such as multiple submission, or invalid positioning, etc.) it is interpreted as 'invalid node detected'.

In embodiments, notification(s) of invalid node(s) may or may not be sent 310 and one or more countermeasures may or may not be deployed 311. Countermeasures comprise but are not limited to: locating and disabling the node, bus shutdown, total system shutdown, as configured by the customer, manufacturer, or other concerned party.

Figure 3C:
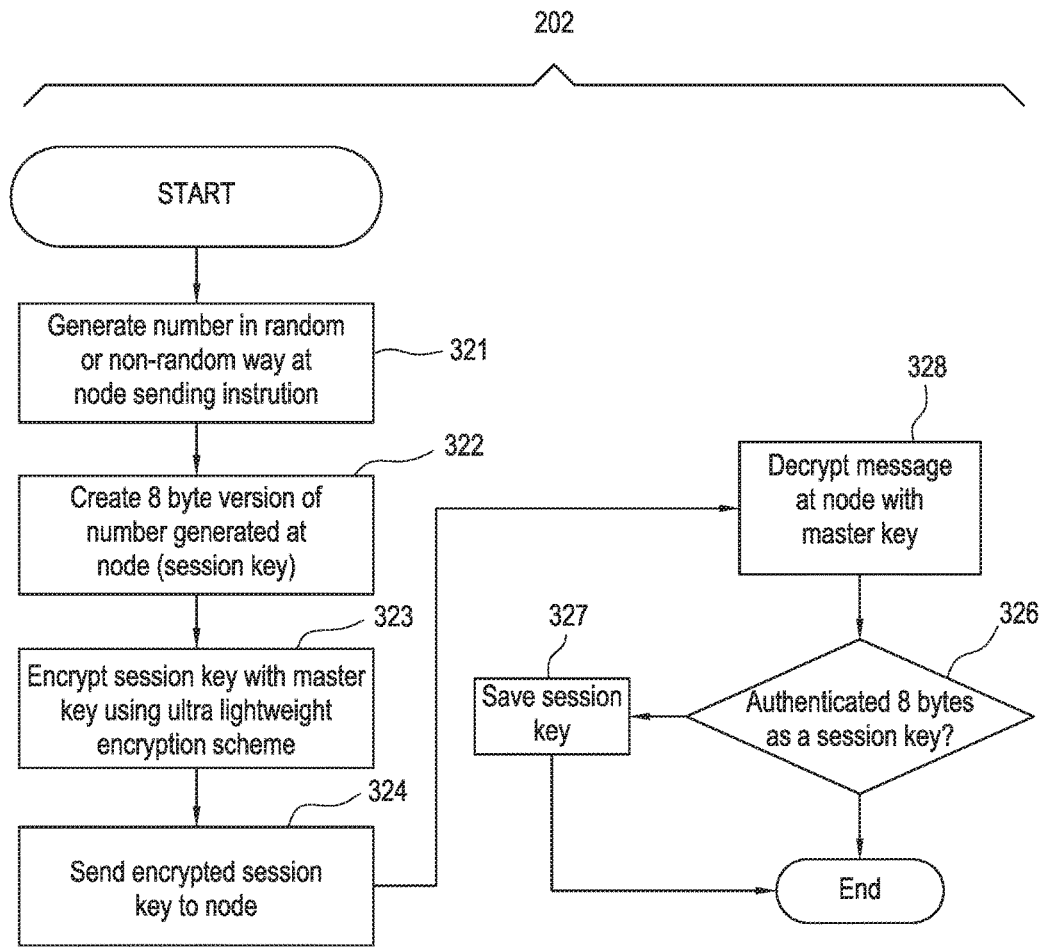

Referring to FIG. 3c, in embodiments, session key distribution module 202 provides a method for domain controller(s) 2-6 to generate and securely distribute symmetric random or non-randomly generated session keys 321 at random or non-random intervals to participating nodes.

In embodiments, a domain controller may also derive a session key from the lower order bits or combination thereof from one or more types of sensors whose values are available. (e.g. the lower order bits of an accelerometer and/or thermometer, when combined should provide enough entropy to provide near true randomness.)

In embodiments, a next session key 321 is generated, at any frequency that is sufficient to achieve the aims of securing the data transmitted by encrypting with a repetitively changing key. For example, the session key 321 could change 10 times per second.

In embodiments, the session key generated is an 8 byte session key 322 and ensures the session key will match a pre-defined heuristic (for example all bytes must be modulated as an ASCII digit zero to nine or some other well-defined set of values expressible in each byte). The session keys are encrypted with the master key using an ultra-lightweight encryption scheme 323 and sent across the CAN bus, LIN bus or related network transport 324.

In embodiments the ultra-lightweight encryption scheme is customizable i.e. a user may or may not wish to change a preset encryption scheme on the system. A user interface allows this selection to be made.

In embodiments, the session key at each node is transmitted on one or more of the same channel(s) as instructional data (message ID(s)) or a different channel. When session keys are transmitted on the message ID data channel, this is referred to as a virtual channel, because of the virtual recognition of the session key at the one or more receiving node by way of 325-327. The session keys are sent in-between the data messages and are discovered by the recipient node by performing a decryption with the master key 325. When the resultant plaintext matches the heuristic, it is known to be a valid session key 326 and saved by the recipient node 327. The recipient node uses the new session key to encrypt future data messages until a new session key is received.

Figure 3D:
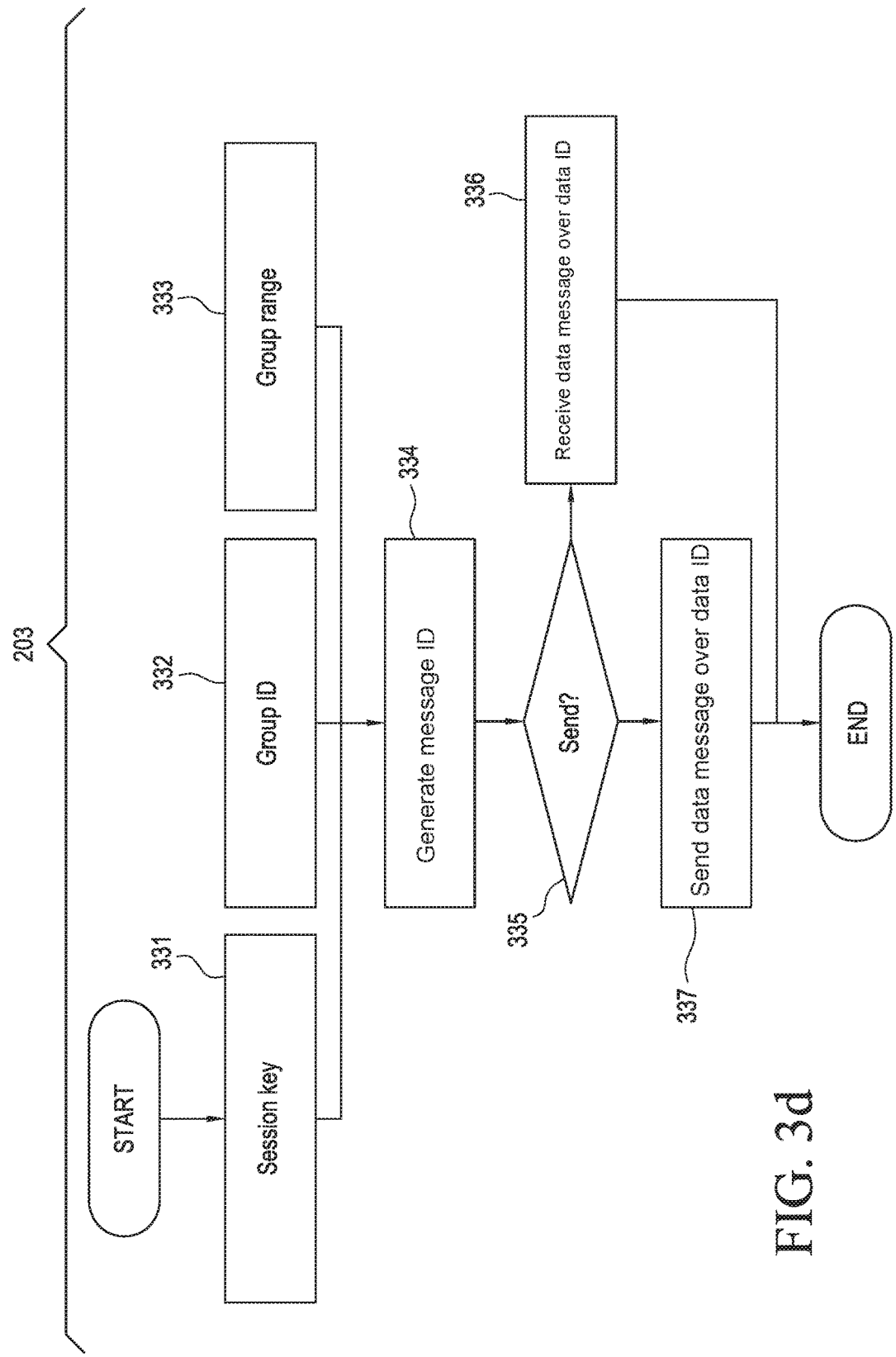

Referring to FIG. 3d, in embodiments, runtime authentication module 203 provides a method to authenticate messages from nodes based on their message ID. If either the transmitting or receiving nodes cannot provide valid credentials to this module, required to synchronize the message ID, they will not be able to communicate. Both the transmitting & receiving nodes must provide the following information: (i) a session key 331 (ii) a group identifier 332 (iii) a group range 333. Module 203 computes the current message ID 334 modulated to the group range based on the inputs 331-333. If the node is sending data 335, data is sent across the modulated message ID channel 337. If the node is attempting to receive data, data is only read from the modulated message ID channel 336. If either node cannot provide all three credentials, the communication is viewed as inauthentic, and the message is discarded.

In embodiments, any appropriate countermeasures to inauthentic nodes are enacted. Countermeasures comprise but are not limited to: locating and disabling the node, bus shutdown, total system shutdown, as configured by the customer, manufacturer, or other concerned party.

Figure 3E:
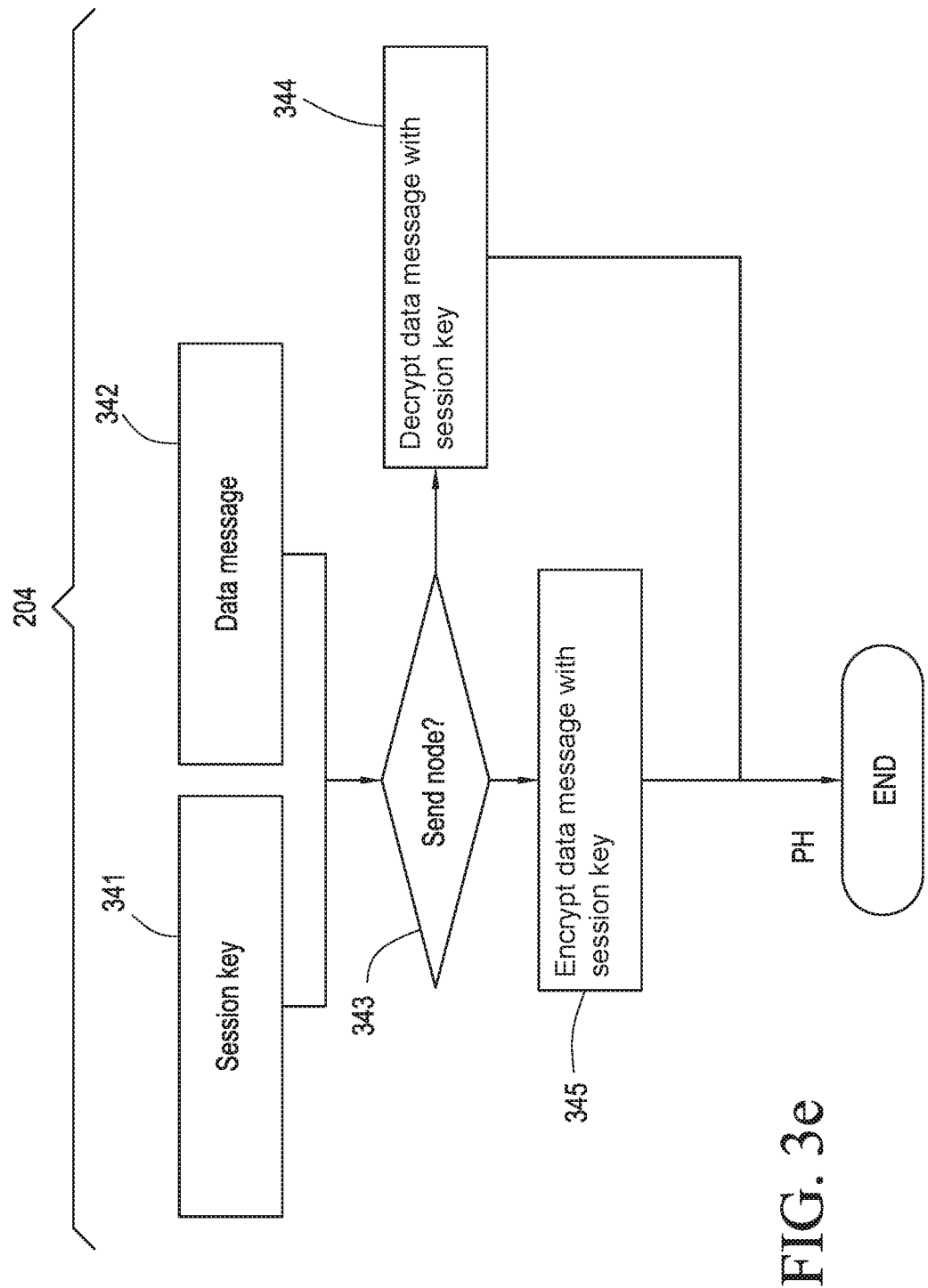

Referring to FIG. 3e, in embodiments, an ultra-lightweight encryption module 204 provides a method for encryption/decryption using existing ultra-lightweight encryption modules suitable for use on block sizes down to 8 bytes. In embodiments with a selectable cipher, multiple ciphers may or may not be pre-integrated for user selection. During pre-integration or afterwards, callbacks allow the user to integrate their own cipher(s) based on their requirements. Module 204 requires the user to specify the encryption key 341 and the data message 342.

In embodiments, one or more cipher may be substituted for the one or more cipher that is used. If one or more substitution(s) is made this is achieved by one or more of: using a switch, selecting an option on a graphical user interface, being chosen by the user after manufacture in some other manner or being chosen by the user or some other designated person at the time of manufacture in any manner at all.

Examples include the following non-limiting encryption protocol configuration options: Simon (NSA), Speck (NSA), and Treyfer.

In embodiments, when the operation is from a transmitting node 343 then the data message is encrypted with the session key using the selected cipher 345. When the operation is being requested by a receiving node, the data is decrypted with the session key using the selected cipher 344. The ultra-lightweight encryption module may or may not be used programmatically to encrypt or decrypt data without regard to the transmission of that data.

In embodiments, the secured network module 200 is the software development kit (SDK) which ties all of the sub-modules 201-204 together under a single application programming interface (API) to provide the complete security solution.

In embodiments each sub-module may be disabled or enabled according to the user selection and all configuration options for each module may or may not be specified and executed in a manner as shown in FIG. 2.

In embodiments, operationally the secured network module first establishes a master key securely among all participating nodes, before sending a respective encrypted message payload. This uses, for example, a master key establishment and static authentication module as shown in 201. The master key is a symmetric key, which may be any number of bytes/bits as may be needed to meet user or manufacturer requirements. The master key anchors a root chain of trust and in embodiments is used to encrypt session keys.

In embodiments, a user who configures, or manufacturer may or may not choose to obtain a master key via some other method. A master key may or may not be programmatically modified similarly on each node. When a master key has been established, a session key distribution module is invoked as shown in 202. When a session key has been synchronized across all participating nodes, runtime authentication may or may not be enacted as described in 203. This provides a runtime message ID for either transmission or receipt of a data message. A runtime authentication module has the added benefit of decreasing processing cycles required to process data messages, as unauthentic data messages will be discarded due to a lack of a valid message ID. Finally, a message payload is either encrypted or decrypted with the session key using, e.g., an ultra-light-weight encryption module as shown in 204.

In embodiments, all the above processes may be confined to any sub-area of the network up to and including an entire network. For example processes occurring at node DC 2 in FIG. 1, may or may not occur independently at node DC 4. One or more of DC 4-6 and the node(s) 111-133 shown connected to it may be treated as part of the network of any other one or more DC 4-6 of which that one or more DC is the domain controller.

In embodiments, no particular chip or operating system is preferred to implement any part of the disclosure and no development platform, compiler of code or toolchain is preferred. In addition the code to implement this disclosure can be integrated any ECU software stack which provide CAN bus communication capability.

In embodiments, code according to embodiments of this disclosure may be distributed as source code, object based code or in binary form.

In embodiments, the above code may or may not be implemented as a library.

In embodiments, the security schemes disclosed herein are implemented as software program instructions, although one or more aspects of these schemes may or may not be implemented in firmware or using hardware logic.

In embodiments, the speed with which the keys are distributed can be varied by configuring suitable to allow smooth running on different components of a CAN bus. For example: braking components on a car need a high volume of data to operate correctly whereas opening and closing windows needs less data to operate correctly. Both sets of data may or may not be sent via CAN bus. A channel carrying a larger amount of data may transfer data faster. Session keys sent may be sent along such channels at an appropriate speed for an effective operation of a relevant component.

In embodiments, software for an encryption protocol can be added to the CAN bus code including or excluding the CAN bus kernel by the one or more method of plugging in a physical chip containing the new code and uploading the software or by uploading software wirelessly.

In embodiments, wherever a number is required to be generated the time at which the sampling occurs can be used as a data sampling source for that number required.

Figure 4:
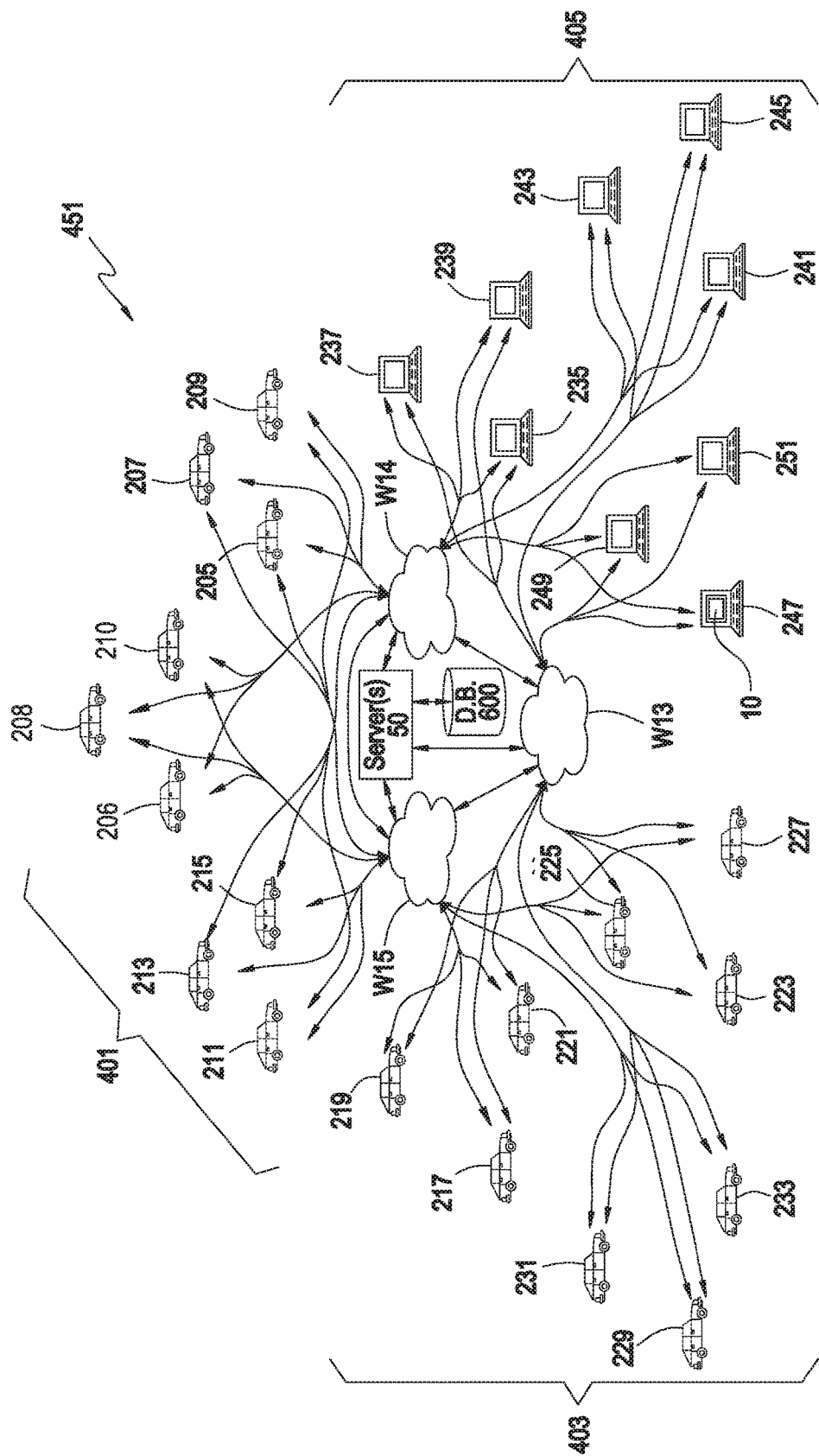
FIG. 4 is a schematic diagram of at least three exemplary digitally stored and digitally operated computer network environments, in which embodiments may be implemented.

FIG. 4 is a diagram of computer network 451 including three exemplary environments, in which embodiments may be implemented. While the following is described in terms of FIG. 4, the embodiments are not limited to the environment(s) illustrated in FIG. 4. For example, any system having generally the structure of FIG. 4, or that would benefit from the operation, methods and functions as described herein may be used.

In exemplary embodiments, system 451 shows terminal clients 205-251 each or collectively comprising one or more browser(s) 10 of terminal 247 (browser also in each of other terminals, but not shown) which is/are used to connect to server(s) 500 over one or more networks W13, W14, and W15.

According to embodiments, browser 10 may include any device, application or module that enables a user or computer to navigate and/or retrieve data from another data source, typically over a network. Browser 10 may include any conventional web browser such as those that are widely available. According to further embodiments, browser 10 may also be configured to use any number of protocols, known now or developed in the future, including protocols such as HTTP, FTP, and underlying protocols such as TCP/IP or UDP. In embodiments, browser 10 is configured to run (or execute) web applications. Web applications are applications that can be hosted within a web browser or those that can be accessed, for example, over a network such as Ethernet, the Internet, the TOR network, the dark web, the dark net or an intranet.

Browser 10 can further communicate with an input (not shown) to allow a user to input data, to input commands, or to provide other control information to browser 10. Browser 10 may request content from one or more server(s) 50, based on prior user input that is stored at one or more terminal(s) or server(s) 50 before accessing server(s) 50, and upon which instructions later sent to server 50 are calculated. Server(s) 50 may respond to the request by providing content back to browser 10 and client 247 via network W13. Browser 10 may also be configured to retrieve content from server(s) 50 without user intervention.

In embodiments, network(s) W13, W14, and W15 can be any type of data network or combination of data networks including, but not limited to, a local area network (LAN) accessed locally or remotely such as via a VPN, a medium area network, or a wide area network such as the Internet. Network W13, for example, can be a wired or wireless network that allows client 247 and server(s) 50 to communicate with each other. Network W13 can further support world-wide-web (e.g., Internet) protocols and services.

Server(s) 50 provides CAN bus content (e.g., web pages, applications (or "apps"), audio, video, etc.) that can be retrieved by client 247 over network W13. Content retrieved by client 247 can be disseminated via browser 10. In various embodiments, server(s) 50 and/or browser 10 includes one or more features of network 200, which is described further below.

As illustrated in FIG. 4, in embodiments, a base functional component of one aspect of the disclosure is composed of at least one of a plurality of terminals 205 to 251, configured to be ordered by predetermined default settings or user-selected settings and/or software instructions into one or more dynamically changing and rearranging user terminal groupings. Certain network terminals and/or systems, e.g., system 451, connect and allow exchange of information between local or far flung terminals within and from at least, but not limited to, three distinct types of networks W13, W14, and W15.

In embodiments, terminal group 401 comprises terminals 205 to 215, terminal group 403 comprises terminals 217 to 233, and terminal group 405 comprises terminals 235 to 251, each group and collective groups illustrating flow of data, albeit on a very small scale, among and across varied networks, such as clear network W13, dark-net or dark-web W14 (e.g., employed via The Onion Router (TOR)), and peer-to-peer network W15 via at least one (or more) server(s) 50. Server(s) 50 receive, store, retrieve and deliver, across and at numerous and geographically disparate locations, user account data on one or more database(s) 600.

In embodiments, terminal and system operations may or may not in whole or in part be effectuated, executed, or implemented on or via clear network W13 (comprising at least all of, or just a portion of, terminal groups 403 and 405) whereby individual terminals, server(s) 50, or a combination thereof, calculate the actions to be taken on respective data sets, and propagate(s) those actions out to the network via server(s) 50 and beyond to all other users.

In embodiments, terminal and system operations may or may not in whole or in part effectuated, executed, or implemented on or via dark net W14 (comprising at least all of, or just a portion of, terminal groups 401 and 405) whereby individual terminals, server(s) 50, or a combination thereof calculate the actions to be taken on respective data sets, and propagate(s) those actions out to the network via server(s) 50 and beyond to all other users.

In embodiments, terminal and system operations may or may not in whole or in part effectuated, executed, or implemented on or via a peer to peer network W15 (comprising at least all of, or just a portion of, terminal groups 401 and 403) whereby one or more terminals, server(s) 50, or a combination thereof, calculate the actions to be taken on respective data sets, and propagate(s) those actions out to the network.

In embodiments, server(s) 50 execute instructions for user account data deletion after a retention period—and not immediately upon server(s) 50 receiving the instructions to delete certain data from one or more terminals, and/or not immediately upon terminal(s) receiving the instructions to delete certain data at one or more terminals.

In embodiments, at least one of terminals 205 to 251 transmit instructions to server(s) 50 to execute instructions causing successful encryption of associated user account object data from database(s) 600. In turn, associated account terminals, such as used by other vehicles, may (or may not) receive alerting data indicating the effectiveness of one or more of the herein disclosed embodiments, thereby creating an acceleration and scaling of at least several of the technical advantages of various herein disclosed embodiments.

In embodiments, each terminal may or may not be geographically remote from or local to the computers that access and control the storage devices on which social network site user data are stored.

In embodiments, each terminal may or may not be part of one or more device set(s), the one or more device set(s) that may or may not comprising only one or multiple—single user, entity (e.g., informal group) or participant—controlled, owned or used device(s).

In embodiments, any one or more of these terminal(s) or device set(s) may or may not include for example remote log-on and/or remote usage via any Web-capable device to a Web-based ASP or peer-to-peer decentralized network even though device ownership, possession and/or control is only temporary and/or through established via other-user-owned or installed applications, such as by embedded or remote implementation via a widely used social media site application or website.

In embodiments, client terminal 247 and server 50 may or may not each be implemented on a computing device. Such a computing device includes, but is not limited to, a vehicle ECU or vehicle microcontroller, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, and hardware. The computing device may also have multiple processors and multiple shared or separate memory components. Software may include one or more applications and an operating system. Hardware can include, but is not limited to, a processor, memory and graphical user interface display. An optional input device, such as a mouse or touch screen, may be used.

System and Digital Communications Network Hardware

Figure 5:
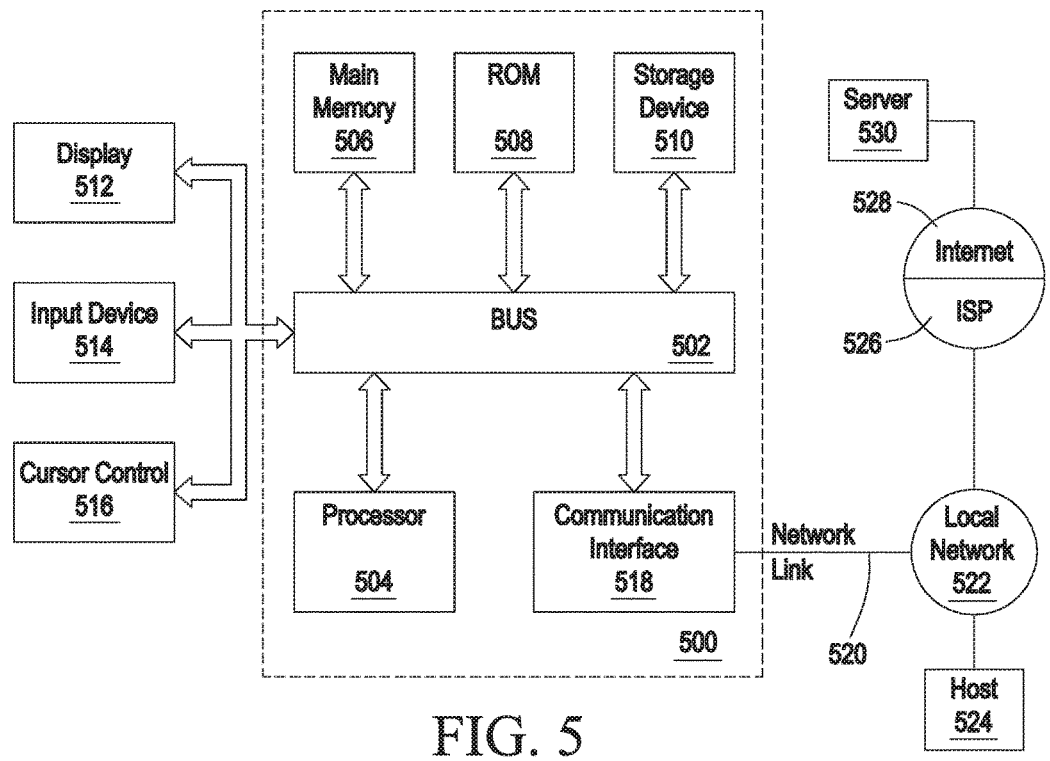
FIG. 5 illustrates an example computer useful for implementing embodiments, along with several network features that may be used in embodiments.

Another aspect of the disclosure is a computer system. Referring to FIG. 5 and according to at least one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

In embodiments, various ECUs and CAN buses may or may not be used. Non-limiting examples include, LIN, MOST, FlexRay and all variants of the CAN Bus including CAN 2.0 and CAN FD.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to at least one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process operations described herein. In alternative embodiments, hard-wired circuitry may be used in place of or in combination with software instructions.

The terms "storage media" and "storage device" as used herein refer to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media and storage device are distinct from but may be used in conjunction with transmission media. Transmission media participates in transferring information between storage media/devices. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In at least one such implementation, communication interface 518 sends and receives one or more of electrical, electromagnetic and optical signals (as with all uses of "one or more" herein implicitly including any combination of one or more of these) that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In at least one embodiment of the Internet example, a server 530 might transmit a requested code for an application program through Internet 528, ISP 526, local network 522 and communication interface 518.

In embodiments, the received code may be one or more of executed by processor 504 as it is received, and/or stored in storage device 510, or other non-volatile storage for later execution.

Figure 6:
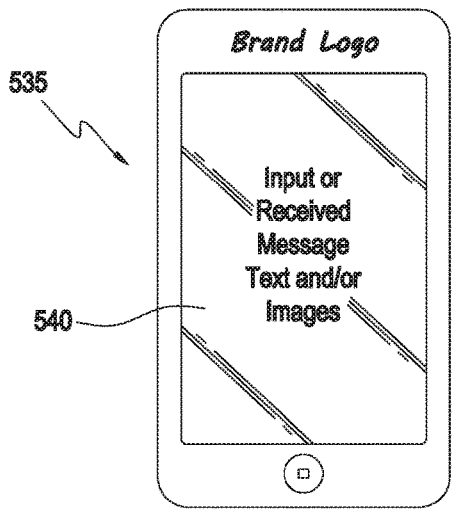
FIG. 6 illustrates an exemplary embodiment of the computer of FIG. 5 in a mobile terminal.

Now referring to FIG. 6, in at least one embodiment a device used in accordance with this disclosure is or comprises mobile display or touch screen input smart phone or tablet 535, which is shown displaying direct user-to-device input message text and or image(s), or remotely received message text and/or image(s) 540. FIG. 6 shows a possible interface for a user to control one or more of the above options that may be varied, according to embodiments. In FIG. 6 a phone is shown but other interfaces are possible.

Computer-Readable Medium

Another aspect of the disclosure is one or more computer-readable media (or computer storage apparatus) having a program, which when executed by one or more processors, such part of one or more of the systems described herein, causes the one or more processors to enable, allow or cause devices to perform any one of the methods as variously comprising any one or more of its various embodiments or sub-embodiments described above or otherwise covered by the appended claims.

In embodiments, the one or more computer-readable media are non-transitory media such as, but not limited to HDD and SSD disk drives, thumb and other flash drives, DVDs, CDs, various static and dynamic storage devices and other numerous storage media.

In embodiments, the one or more computer-readable media comprise or are one or more transitory electronic signals.

The following numbered clauses set forth various embodiments of the disclosure:

1. At least one (a) computer-implemented method, (b) terminal, by way of (i) means for or (ii) software module(s) for performing operation(s), or (iii) comprising at least one processor; and at least one memory storing instruction(s)

that, when executed by the at least one processor, cause the at least one processor to, (c) system, by way of (i) means for, or (ii) software module(s) for performing operation(s), or (iii) comprising at least one processor; and at least one memory storing instructions that, when executed by the at least one processor, cause the at least one processor to, or (d) transitory or non-transitory computer-readable medium (or alternately also herein throughout, computer storage apparatus) containing instructions which when executed by one or more computers each or collectively comprising one or more processors cause operation(s), according to any one of the above or below clauses, the operation(s) comprising:

obtaining, receiving or providing a message.

2. A method, terminal, system or, transitory or non-transitory computer-readable medium according to any one of the above or below clauses, further comprising generating at least one first key(s), and securely establishing it at multiple nodes using at least one asymmetrically established second key, the multiple nodes including at least one message-transmitting node(s) and one or more message-receiving node(s).

3. A method, terminal, system or, transitory or non-transitory computer-readable medium according to any one of the above or below clauses, further comprising generating at least one (optionally symmetric) third key(s) at a location of at least one node(s), the session key(s) generation being one or more of:

(1) repetitive at a cycle speed, and (2) simultaneous at multiple nodes, including at a location of the least one message-transmitting node(s) and at a location of the one or more message-receiving node(s);

4. A method, terminal, system or, transitory or non-transitory computer-readable medium according to any one of the above or below clauses, further comprising encrypting the third key(s) using the first key(s) and distributing it in encrypted form to one or more other node(s).

5. A method, terminal, system or, transitory or non-transitory computer-readable medium according to any one of the above or below clauses, further comprising encrypting a message using at least one third key at the message transmitting node, to produce a ciphertext.

6. A method, terminal, system or, transitory or non-transitory computer-readable medium according to any one of the above or below clauses, further comprising one or more of (a) selectively reducing data available to, or processed by one or more computers communicatively connected to, a digitally stored and digitally operated CAN bus or LIN bus network, (b) improving data security and (c) increasing operational efficiency of the one or more computers or controllers communicatively connected to the digitally stored and digitally operated CAN bus or LIN bus, at a terminal in a multiple-node digital communications network.

7. A method, terminal, system or, transitory or non-transitory computer-readable medium according to any one of the above or below clauses, wherein a CAN bus makes up all communication pathways of the network.

8. A method, terminal, system or, transitory or non-transitory computer-readable medium according to any one of the above or below clauses, wherein one or more of the first key is a master key, the second key is a transient key, and the third key is a session key.

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

9. A method, terminal, system or, transitory or non-transitory computer-readable medium according to any one of the above or below clauses, wherein the multiple node(s) have unique IDs securely pre-stored internally in the network before one or more of:

first activation;

re-activation; and reboot, of the network.

10. A method, terminal, system or, transitory or non-transitory computer-readable medium according to any one of the above or below clauses, wherein the network is entirely internal to one or motor vehicles and comprises a secure application layer or a secure link layer, which secures the motor vehicle network;

wherein the network stores a pre-determined list of unique IDs securely held in at least one memory internal to the network, optionally at one or more domain controller, and wherein the list is established and stored securely by relying only on data that is pre-stored in the network before network activation.

11. A method, terminal, system or, transitory or non-transitory computer-readable medium according to any one of the above or below clauses, wherein the message of one or more of the at least one message-transmitting node(s) and the at least one message-receiving node(s), when executed, operably causes altering of a primary function of one or more mechanical or electronic vehicle component(s) that is operated based on instructions sent to one or more of the at least one message-transmitting node(s) and the at least one message-receiving node(s).

12. A method, terminal, system or, transitory or non-transitory computer-readable medium according to any one of the above or below clauses, wherein a protocol used to establish the at least one asymmetrically established second key(s) over the network uses properties inherent to the network:

to obtain one or more bits of shared secret information and use the one or more bits of shared secret information as at least a portion of the at least one asymmetrically established second key(s), and to securely distribute the at least one symmetric first key(s).

13. A method, terminal, system or, transitory or non-transitory computer-readable medium according to any one of the above or below clauses, wherein the properties inherent to the network include one or more arbitration phase(s), during which one or more communicated logical value, optionally '0', is preferred over some other communicated logical value(s), optionally '1', and optionally, causing one or more of:
  (1) the arbitration phase occurring irrespective of what node(s) either of the logical values has been communicated from;
  (2) the arbitration phase creating an externally visible side channel of information comprising preferred logical value transmissions from one or more single nodes;
  (3) the side channel results from and represents a collection of all transmitted logical values;
  (4) the side channel provides an additional channel that is in addition to one or more node-to-node transmission channels; and
  (5) the side channel is based on multiple logical value transmissions.

14. A method, terminal, system or, transitory or non-transitory computer-readable medium according to any one of the above or below clauses, wherein the arbitration phase can be activated at one or more random point in time, regularly scheduled time or another, optionally selected, time, optionally a time when one or more new second key(s) is selected.

15. A method, terminal, system or, transitory or non-transitory computer-readable medium according to any one of the above or below clauses, wherein the arbitration phase can be extended for any length of time during which secret information in one or more side channel may be recorded in one or more locations in the network and securely stored, thereby reducing the necessary computational load on the network during one or more times when a new, optionally different, version of the at least one second key(s) is required.

16. A method, terminal, system or, transitory or non-transitory computer-readable medium according to any one of the above or below clauses, further comprising at least one store having a maximum memory capacity, the store being associated with one or more of the (optionally message receiving or message transmitting) node(s), the maximum capacity being smaller than what is required to hold the at least one second key(s), the store optionally being part of the at least one memory.

17. A method, terminal, system or, transitory or non-transitory computer-readable medium according to any one of the above or below clauses, wherein at least one of the participating nodes is at least one domain controller(s), and each of the at least one domain controller(s) is able to perform at least as many computations as any other node(s) connectively linked to the at least one domain controller, and is additionally capable of:
  storing the at least first key(s) securely so that the at least first key(s) may be securely distributed.

18. A method, terminal, system or, transitory or non-transitory computer-readable medium according to any one of the above or below clauses, wherein the multiple nodes are one or more of:
  uniquely associated with one or more mechanical or electronic vehicle component(s) that is operated based on instructions sent to one or more of the at least one message-transmitting node(s) and the at least one message-receiving node(s);
  located adjacent to one or more mechanical or electronic vehicle component(s) that is operated based on instructions sent to one or more of the at least one message-transmitting node(s) and the at least one message-receiving node(s);
  comprising only specifically-and-uniquely-defined-by-vehicle-function nodes at spoke ends of a hub-and-spoke CAN or hub-and-spoke LIN architecture;
  not comprising any one or more of a domain controller node, base station node, and master node; and
  comprising any one or more of at least one domain controller node, base station node, and master node.

19. A method, terminal, system or, transitory or non-transitory computer-readable medium according to any one of the above or below clauses, wherein the at least one first symmetric key(s) is generated based on multiple group elements, at least one of the group elements from one or more of:
  each of the message-transmitting nodes in the network;
  each of the message-receiving nodes in the network; and
  at least one domain controller node in the network.

20. A method, terminal, system or, transitory or non-transitory computer-readable medium according to any one of the above or below clauses, wherein the at least one second key(s) is a key derived from a shared secret used to securely relay information to a node that shares the secret.

21. A method, terminal, system or, transitory or non-transitory computer-readable medium according to any one of the above or below clauses, wherein the at least one second key(s) is discarded after sharing information to a node.

22. A method, terminal, system or, transitory or non-transitory computer-readable medium according to any one of the above or below clauses, wherein the multiple group elements are generated and sent to one or more node(s) when operation of the network starts, to enable data to be transmitted securely, thereby minimizing time-delay before network functionality can be accessed.

23. A method, terminal, system or, transitory or non-transitory computer-readable medium according to any one of the above or below clauses, wherein the at least one first key(s) are generated and sent in encrypted form after the network operation starts yet before validation of one or more node(s) has occurred, to enable data to be transmitted securely, thereby minimizing time-delay before network functionality can be accessed.

24. A method, terminal, system or, transitory or non-transitory computer-readable medium according to any one of the above or below clauses, wherein the at least one first key(s) are generated based on one or more of bit(s) of random or non-random data, obtained by one or more method comprising:
  sampling data stored in the network;
  measuring sensor data from one or more sensor(s) associated with one or more nodes in the network, optionally from long string(s) of data obtain or recorded at the one or more sensor(s);
  combining two or more pieces of the sensor data from one or more sensor(s), by using a mathematical function.

25. A method, terminal, system or, transitory or non-transitory computer-readable medium according to any one of the above or below clauses, wherein the at least one second key(s) are generated based on one or more of bit(s) of random or non-random data, obtained by one or more method comprising:
    sampling data stored in the network;
    measuring sensor data from one or more sensor(s) associated with one of more nodes in the network, optionally from long string(s) of data obtain or recorded at the one or more sensor(s);
    combining two or more pieces of the sensor data from one or more sensor(s), by using a mathematical function.

26. A method, terminal, system or, transitory or non-transitory computer-readable medium according to any one of the above or below clauses, wherein instructional messages sent in high noise environments such as is found in motor vehicles can be received at the at least one message-receiving node(s) without certification due to non-destructive arbitration of message data.

27. A method, terminal, system or, transitory or non-transitory computer-readable medium according to any one of the above or below clauses, wherein the at least one second key(s) are each independently generated at two locations, both at a domain controller node, and at one or more of
    one of the message-transmitting node(s), and
    one of the message-receiving node(s).

28. A method, terminal, system or, transitory or non-transitory computer-readable medium according to any one of the above or below clauses, wherein the at least one second key(s) are generated based on information obtained from two-way, shared group element information:
    (1) from each of all of the multiple nodes, to a domain controller node, and
    (2) from the domain controller node to each of all of the multiple nodes, optionally wherein the domain controller node controls a set of components or systems and the shared information is shared only as between nodes that are associated with a strict subset of the set controlled by the domain controller node.

29. A method, terminal, system or, transitory or non-transitory computer-readable medium according to any one of the above or below clauses, wherein the at least one second key(s) are generated based on information obtained from two-way, shared group element information.

30. A method, terminal, system or, transitory or non-transitory computer-readable medium according to any one of the above or below clauses, wherein the at least one first key is generated based on all of the at least one second key(s) from all of the participating nodes.

31. A method, terminal, system or, transitory or non-transitory computer-readable medium according to any one of the above or below clauses, wherein distribution of the at least one first key(s) is achieved by the at least first key(s) being one or more of:
    encrypted at a domain controller, using at least one of the at least one second key(s), which is generated at a domain controller node from information from a first node and information from the domain controller node, and
    unencrypted at the first node, using at least one separately-and-remotely-at-the-first-node-generated duplicate copy of the at least one of the at least one second key(s), the at least one of the at least one second key(s) being uniquely associated with only the first node and the domain controller node.

32. A method, terminal, system or, transitory or non-transitory computer-readable medium according to any one of the above or below clauses, further comprising;
    generating the at least one symmetric third key(s) at the at least one message-transmitting node(s), the at least one symmetric session key(s) generation being one or more of:
    repetitive at a cycle speed, and
    simultaneous at the multiple or participating nodes, including at the at least one message-transmitting node(s) and at the one or more message-receiving node(s).

33. A method, terminal, system or, transitory or non-transitory computer-readable medium according to any one of the above or below clauses, wherein the at least one symmetric third key(s) are generated based on one or more of bit(s) of random or non-random data, obtained by one or more method comprising:
    sampling data stored in the network;
    measuring sensor data from one or more sensor(s) associated with one of more nodes in the network, optionally from long string(s) of data obtain or recorded at the one or more sensor(s);
    combining two or more pieces of the sensor data from one or more sensor(s), by using a mathematical function.

34. A method, terminal, system or, transitory or non-transitory computer-readable medium according to any one of the above or below clauses, wherein the at least one first key(s) is a master key, the at least one second key(s) are multiple transient keys, one for each non-domain-controller node that is either, one of the message-receiving node(s) or one of the message transmitting node(s), and
    the at least one third key(s) comprises one or more session key(s), optionally further comprising encrypting at least one of the at least one payload message(s) using the at least one third key at exactly one of the at least one message-transmitting node(s) to produce a ciphertext.

35. A method, terminal, system or, transitory or non-transitory computer-readable medium according to any one of the above or below clauses, further comprising decrypting the at least one session keys at one or more message-receiving node(s) based on the master key at the message receiving node(s) and decrypting the ciphertext at one or more message-receiving node(s) based on one of the session key(s).

36. A method, terminal, system or, transitory or non-transitory computer-readable medium according to any one of the above or below clauses, wherein at least one of the message-transmitting node(s) and the message-receiving node(s) is authenticated by one or more of:
    validating encrypted node IDs received at the domain controller by way of a comparison at the domain controller of ID messages to a known list of pairs of nodes and unique IDs associated to those nodes; and
    performing a runtime authentication. by requiring the message-transmitting node(s) to provide data over a channel modulated by a message ID value that is calculated by combining the session key(s), the validated group ID(s) and another number (optionally the group range), and requiring the message-receiving node(s) selectively to limit information which is processed to what is received over the channel modulated by the message ID.

37. A method, terminal, system or, transitory or non-transitory computer-readable medium according to any one of the above or below clauses, wherein each of the at least one message-transmitting node(s) and the one or more message-receiving node(s), comprise one or more of:
    at least one constrained vehicle controller area network bus node allowing a data field length of up to 8 bytes;
    at least one constrained vehicle local interconnect network bus node allowing a data field length of up to 8 bytes;

at least one controller area network bus domain controller; and at least one local interconnect network bus domain controller.

38. A method, terminal, system or, transitory or non-transitory computer-readable medium according to any one of the above or below clauses, wherein repeated encryption and decryption occurs within a time range being one or more of:

one or more times per instruction sent to the message-receiving node(s) according to a decision of one or more system user;

one or more times per instruction sent to the message-receiving node(s) according to a decision of a person authorized by one or more system user;

a pre-determined unit of time within the capabilities of available hardware processing power; and a unit of time determined by a computer program or a device enabled with machine learning capabilities.

39. A method, terminal, system or, transitory or non-transitory computer-readable medium according to any one of the above or below clauses, wherein timing of one or more session key(s) being repetitively discarded and replaced is randomized.

40. A method, terminal, system or, transitory or non-transitory computer-readable medium according to any one of the above or below clauses, wherein each of the at least one message-transmitting node(s) and the one or more message-receiving node(s) are established as authentic and wherein one or more of the multiple or participating node(s) are secured by a master node performing one or more of:

accessing a list of node unique ID(s) wherein the list is established securely some time at or after a first activation of a vehicle's ignition and stored in a secure memory of the master node;

establishing the master key and transmitting master key elements in a cryptogram to the participating nodes;

receiving node unique ID(s) encrypted with the master key at one or more node(s) and sent to the master node from the participating node(s); and comparing the IDs received at the master node against the securely established list and securely transmitting all authentic node IDs to other authentic nodes.

41. A method, terminal, system or, transitory or non-transitory computer-readable medium according to any one of the above or below clauses, wherein each of the at least one message-transmitting node(s) and the one or more message-receiving node(s) continue to be authenticated and continuously authenticate that other node(s) are secured by:

(1) encrypting non-instruction implementing messages comprising known valid group ID(s) with a current session key to form a cryptogram and modulating over a given group range;

(2) sending the resulting cryptogram along a data channel to one or more other node(s);

(3) decrypting messages received at the message receiving node with a last known session key received from an authentic node and comparing it to the known valid group IDs; and (4) rejecting any one or more of the received messages and any future message(s) from the at least one message-transmitting node(s) when any one or more of the received messages is not one of the valid group IDs.

42. A method, terminal, system or, transitory or non-transitory computer-readable medium according to any one of the above or below clauses, wherein one or more of the multiple nodes validate their authenticity, using a unique ID as against a pre-stored list that contains the multiple node(s)' unique IDs, with the domain controller after the master key is generated.

43. A method, terminal, system or, transitory or non-transitory computer-readable medium according to any one of the above or below clauses, wherein runtime authentication of currently known session key(s) at one or more node(s) implements authentication of information transmitted from the one or more node(s) by one or more of:

modulating one or more instructional or non-instructional message IDs derived from the session key and from at least one of the one or more node(s), and rejecting information received at a second of the one or more node(s) that has been incorrectly modulated based on the session key in use at the message-receiving node; and requiring that message(s) identical to a correctly modulated information derived from the session key in use be transmitted on a channel where the channel is modulated by one or more of the same message or any particular message derived from that message.

44. A method, terminal, system or, transitory or non-transitory computer-readable medium according to any one of the above or below clauses, wherein at least one of the multiple nodes is a domain controller.

45. A processor-based terminal, according to any one of the above or below clauses comprising any one or more of:

at least one processor; and at least one memory storing instructions that, when executed by the at least one processor, cause the at least one processor to any one or more of:

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

46. A processor-based system according to any one of the above or below clauses, comprising:

at least one processor; and at least one memory storing instructions that, when executed by the at least one processor, cause the at least one processor to any one or more of:

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

47. A computer storage apparatus encoded with a computer program according to any one of the clauses above or below, the program comprising instructions that when executed by data processing apparatus cause the data processing apparatus to perform operations, comprising any one or more of:

generating at least one symmetric first key(s), across all participating nodes in the multiple-node digital communications network and securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s); and decrypting the at least one encrypted payload message using the decrypted at least one third key(s), at the at least one message-receiving node(s).

Embodiments can work with software, hardware, and/or operating system implementations other than those described herein. Any software, hardware, and operating system implementations suitable for performing the functions described herein can be used. Embodiments are applicable to both a client and to a server or a combination of both.

While it is apparent that the illustrative embodiments of the disclosure herein fulfil one or more objectives or inventive solutions, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present disclosure.

The above embodiments are to be understood as illustrative examples of the disclosure. Further embodiments of the disclosure are envisaged. It is to be understood that any feature described in relation to any one or one set of embodiments may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed:

1. A method of increasing operational efficiency of one or more computers or controllers at a terminal in a multiple-node digital communications network, comprising:

generating at least one symmetric first key(s), across all participating nodes in the multiple-node digital communications network;

securely distributing the at least one first key(s) in encrypted form to multiple participating nodes of the multiple-node digital communications network, using at least one asymmetrically established second key(s), the participating nodes including at least one message-transmitting node(s) and at least one message-receiving node(s);

generating at least one symmetric third key(s) for one or more communication session that includes one or more communications from the at least one message-transmitting node(s) to the message-receiving node(s);

encrypting at least one payload message using the at least one third key(s) at the at least one message-transmitting node(s), sending the encrypted at least one payload message, and receiving the encrypted at least one payload message at the at least one message-receiving node(s);

encrypting the at least one third key(s) using the at least one first key(s), sending the encrypted at least one third key(s), and receiving the encrypted at least one third key(s) at the at least one message-receiving node(s);

decrypting the at least one third key(s) using the securely distributed at least one first key(s), at the at least one message-receiving node(s);

decrypting the at least one encrypted payload message using the decrypted at least one third key(s), at the at least one message-receiving node(s);

wherein the network is a motor vehicle network entirely internal to one or more motor vehicles and comprises one or more of a secure application layer and a secure link layer, which secures the motor vehicle network.

2. A method according to claim 1, wherein the multiple node(s) have unique IDs securely pre-stored internally in the network before one or more of:

first activation;
re-activation; and
reboot,
of the network.

3. A method according to claim 1,
wherein the network stores a pre-determined list of unique IDs securely held in at least one memory internal to the network, and wherein the list is established and stored securely by relying only on data that is pre-stored in the network before network activation.

4. A method according to claim 1, wherein the message of one or more of the at least one message-transmitting node(s) and the at least one message-receiving node(s), when executed, operably causes altering of a primary function of one or more mechanical or electronic vehicle component(s) that is operated based on instructions sent to one or more of the at least one message-transmitting node(s) and the at least one message-receiving node(s).

5. A method according to claim 1, wherein a protocol used to establish the at least one asymmetrically established second key(s) over the network uses properties inherent to the network:
to obtain one or more bits of shared secret information and use the one or more bits of shared secret information as at least a portion of the at least one asymmetrically established second key(s), and
to securely distribute the at least one symmetric first key(s).

6. A method according to claim 5, wherein the properties inherent to the network include one or more arbitration phase(s), during which one or more communicated logical value is preferred over some other communicated logical value(s), causing one or more of:
(1) the arbitration phase occurring irrespective of what node(s) either of the logical values has been communicated from;
(2) the arbitration phase creating an externally visible side channel of information comprising preferred logical value transmissions from one or more single nodes;
(3) the side channel results from and represents a collection of all transmitted logical values;
(4) the side channel provides an additional channel that is in addition to one or more node-to-node transmission channels; and
(5) the side channel is based on multiple logical value transmissions.

7. A method according to claim 6, wherein the arbitration phase is configured to be activated at one or more random point in time, regularly scheduled time or another time.

8. A method according to claim 6, wherein the arbitration phase is configured to be extended for any length of time during which secret information in one or more side channel may be recorded in one or more locations in the network and securely stored, thereby reducing the necessary computational load on the network during one or more times when a new version of the at least one second key(s) is required.

9. A method according to claim 1, further comprising at least one store having a maximum memory capacity, the store being associated with one or more of the node(s), the maximum capacity being smaller than what is required to hold the at least one second key(s).

10. A method according to claim 1, wherein at least one of the participating nodes is at least one domain controller(s), and each of the at least one domain controller(s) is configured to perform at least as many computations as any other node(s) connectively linked to the at least one domain controller, and is
configured to store the at least first key(s) securely so that the at least first key(s) may be securely distributed.

11. A method according to claim 1, wherein the multiple nodes are one or more of:
uniquely associated with one or more mechanical or electronic vehicle component(s) that is operated based on instructions sent to one or more of the at least one message-transmitting node(s) and the at least one message-receiving node(s);
located adjacent to one or more mechanical or electronic vehicle component(s) that is operated based on instructions sent to one or more of the at least one message-transmitting node(s) and the at least one message-receiving node(s);
comprising only specifically-and-uniquely-defined-by-vehicle-function nodes at spoke ends of a hub-and-spoke controller area network (CAN) or hub-and-spoke local interconnect network (LIN) architecture;
not comprising any one or more of a domain controller node, base station node, and master node; and
comprising any one or more of at least one domain controller node, base station node, and master node.

12. A method according to claim 1, wherein the at least one first symmetric key(s) is generated based on multiple group elements, at least one of the group elements from one or more of:
each of the message-transmitting nodes in the network;
each of the message-receiving nodes in the network; and
at least one domain controller node in the network.

13. A method according to claim 1, wherein the at least one second key(s) is a key derived from a shared secret used to securely relay information to a node that shares the secret.

14. A method according to claim 1, wherein the at least one second key(s) is discarded after sharing information to a node.

15. A method according to claim 1, wherein the multiple group elements are generated and sent to one or more node(s) when operation of the network starts, to enable data to be transmitted securely, thereby minimizing time-delay before network functionality can be accessed.

16. A method according to claim 1, wherein the at least one first key(s) are generated and sent in encrypted form after the network operation starts yet before validation of one or more node(s) has occurred, to enable data to be transmitted securely, thereby minimizing time-delay before network functionality can be accessed.

17. A method according to claim 1, wherein the at least one first key(s) are generated based on one or more of bit(s) of random or non-random data, obtained by one or more of:
sampling data stored in the network;
measuring sensor data from one or more sensor(s) associated with one or more nodes in the network;
combining two or more pieces of sensor data from one or more sensor(s), by using a mathematical function.

18. A method according to claim 1, wherein the at least one second key(s) are generated based on one or more of bit(s) of random or non-random data, obtained by one or more of:
sampling data stored in the network;
measuring sensor data from one or more sensor(s) associated with one of more nodes in the network; and
combining two or more pieces of sensor data from one or more sensor(s), by using a mathematical function.

19. A method according to claim 1, wherein instructional messages sent in high noise environments such as is found in motor vehicles can be received at the at least one message-receiving node(s) without certification due to non-destructive arbitration of message data.

20. A method according to claim 1, wherein the at least one second key(s) are each independently generated at two locations, both at a domain controller node, and at one or more of one of the message-transmitting node(s), and
one of the message-receiving node(s).

21. A method according to claim 1, wherein the at least one second key(s) are generated based on information obtained from two-way, shared group element information:
   (1) from each of all of the multiple nodes, to a domain controller node, and
   (2) from the domain controller node to each of all of the multiple nodes.

22. A method according to claim 1, wherein the at least one second key(s) are generated based on information obtained from two-way, shared group element information.

23. A method according to claim 1, wherein the at least one first key is generated based on all of the at least one second key(s) from all of the participating nodes.

24. A method according to claim 1, wherein distribution of the at least one first key(s) is achieved by the at least first key(s) being one or more of:
   encrypted at a domain controller, using at least one of the at least one second key(s), which is generated at a domain controller node from information from a first node and information from the domain controller node, and
   unencrypted at the first node, using at least one separately-and-remotely-at-the-first-node-generated duplicate copy of the at least one of the at least one second key(s), the at least one of the at least one second key(s) being uniquely associated with only the first node and the domain controller node.

25. A method according to claim 1, further comprising; generating the at least one symmetric third key(s) at the at least one message-transmitting node(s), the at least one symmetric session key(s) generation being one or more of:
   repetitive at a cycle speed, and
   simultaneous at the multiple or participating nodes, including at the at least one message-transmitting node(s) and at the one or more message-receiving node(s).

26. A method according to claim 1, wherein the at least one symmetric third key(s) are generated based on one or more of bit(s) of random or non-random data, obtained by one or more method comprising:
   sampling data stored in the network;
   measuring sensor data from one or more sensor(s) associated with one of more nodes in the network;
   combining two or more pieces of the sensor data from one or more sensor(s), by using a mathematical function.

27. A method according to claim 1, wherein the at least one first key(s) is a master key, the at least one second key(s) are multiple transient keys, one for each non-domain-controller node that is either, one of the message-receiving node(s) or one of the message transmitting node(s), and
   the at least one third key(s) comprises one or more session key(s).

28. A method according to claim 1, further comprising decrypting the at least one session keys at one or more message-receiving node(s) based on the master key at the message receiving node(s) and decrypting the ciphertext at one or more message-receiving node(s) based on one of the session key(s).

29. A method according to claim 1, wherein at least one of the message-transmitting node(s) and the message-receiving node(s) is authenticated by one or more of:
   validating encrypted node IDs received at the domain controller by way of a comparison at the domain controller of ID messages to a known list of pairs of nodes and unique IDs associated to those nodes; and
   performing a runtime authentication, by requiring the message-transmitting node(s) to provide data over a channel modulated by a message ID value that is calculated by combining the session key(s), the validated group ID(s) and another number, and requiring the message-receiving node(s) selectively to limit information which is processed to what is received over the channel modulated by the message ID.

30. A method according to claim 1, wherein each of the at least one message-transmitting node(s) and the one or more message-receiving node(s), comprise one or more of:
   at least one constrained vehicle controller area network bus node allowing a data field length of up to 8 bytes;
   at least one constrained vehicle local interconnect network bus node allowing a data field length of up to 8 bytes;
   at least one controller area network bus domain controller; and
   at least one local interconnect network bus domain controller.

* * * * *